United States Patent

Fellows

[11] Patent Number: 5,150,242
[45] Date of Patent: Sep. 22, 1992

[54] INTEGRATED OPTICAL COMPUTING ELEMENTS FOR PROCESSING AND ENCRYPTION FUNTIONS EMPLOYING NON-LINEAR ORGANIC POLYMERS HAVING PHOTOVOLTAIC AND PIEZOELECTRIC INTERFACES

[76] Inventor: William G. Fellows, 8610 Snowden Loop, Laurel, Md. 20708

[21] Appl. No.: 784,630

[22] Filed: Oct. 24, 1991

Related U.S. Application Data

[63] Continuation of Ser. No. 569,893, Aug. 17, 1990, abandoned.

[51] Int. Cl.[5] ............................ G02B 6/12; G02F 3/00
[52] U.S. Cl. .................................. 359/108; 252/582; 385/14; 385/122
[58] Field of Search ............... 359/108, 328; 385/14, 385/143, 145, 122, 116; 252/582

[56] References Cited

U.S. PATENT DOCUMENTS

| | | | |
|---|---|---|---|
| 3,849,740 | 11/1974 | Brandt | 350/96.12 X |
| 3,877,781 | 4/1975 | Kaminow | 350/96.14 |
| 3,877,782 | 4/1975 | Kaminow | 350/96.14 |
| 3,904,270 | 9/1975 | Cheo | 350/96.14 |
| 3,924,931 | 12/1975 | Cheo | 350/96.14 |
| 4,431,263 | 2/1984 | Garito | 385/143 |
| 4,583,817 | 4/1986 | Papuchon | 350/96.14 |
| 4,729,618 | 3/1988 | Yoshida et al. | 350/96.11 |
| 4,775,215 | 10/1988 | Teng et al. | 350/96.34 |
| 4,792,208 | 12/1988 | Ulman et al. | 385/143 |
| 4,796,971 | 1/1989 | Robello et al. | 385/143 |
| 4,886,339 | 12/1989 | Scozzafava et al. | 385/141 |
| 4,887,877 | 12/1989 | Inoue et al. | 350/96.11 |
| 4,929,392 | 5/1990 | Trend | 359/328 |
| 4,941,996 | 7/1990 | Trend et al. | 359/328 |
| 4,952,791 | 8/1990 | Hinton et al. | 250/213 AX |
| 4,965,020 | 10/1990 | Allen et al. | 350/96.13 X |
| 4,992,202 | 2/1991 | Allen et al. | 350/96.12 X |
| 4,992,203 | 2/1991 | Allen et al. | 350/96.12 X |
| 4,992,654 | 2/1991 | Crossland et al. | 359/108 |
| 4,999,486 | 3/1991 | Falk | 250/213 A |
| 5,005,933 | 4/1991 | Shimuzu | 359/108 |
| 5,009,483 | 4/1991 | Rockwell | 385/116 |
| 5,024,499 | 6/1991 | Falk | 359/108 |

OTHER PUBLICATIONS

P. R. Low, *IBM Tech. Discl. Bull.*; (vol. 1, No. 5; Feb., 1960; pp. 99–100.
Garito et al, "Organic Crystals and Polymers—A New Class of Nonlinear Optical Materials"; Laser Focus; (Feb., 1982, pp. 59–64).
S. Gray, "A New Breed of Photonic Polymers"; Photonics Spectra; (Sep., 1989, pp. 125–126).

*Primary Examiner*—Martin Lerner
*Attorney, Agent, or Firm*—Paul S. Clohan; Guy M. Miller; Muzio B. Roberto

[57] ABSTRACT

An integrated optical device consisting of a monolithic crystalline substrate, an optical waveguide channel having an input end-face and an output end-face formed on the substrate and extending longitudinally along the substrate, the optical waveguide channel having at least one optical gate consisting of a non-linear organic polymer, a signal input path to the optical gate, and an interface for controlling the state of each optical gate.

8 Claims, 11 Drawing Sheets

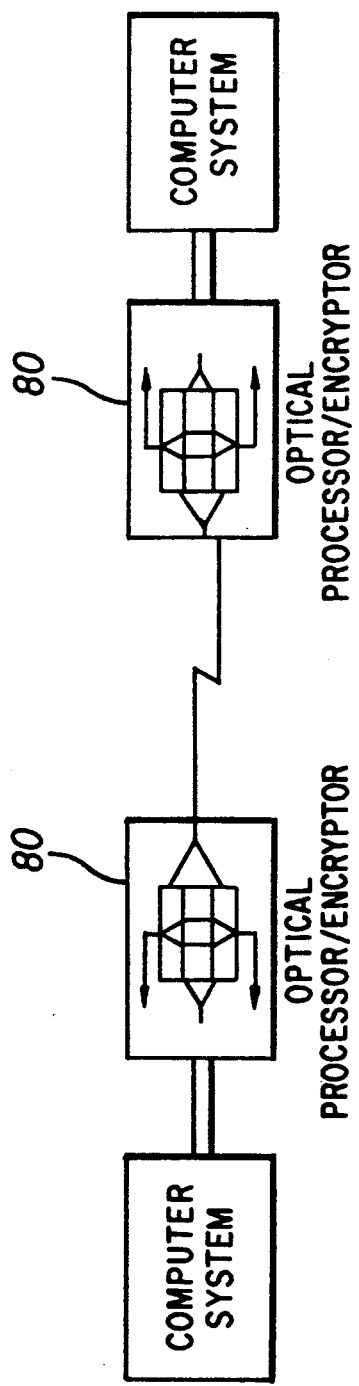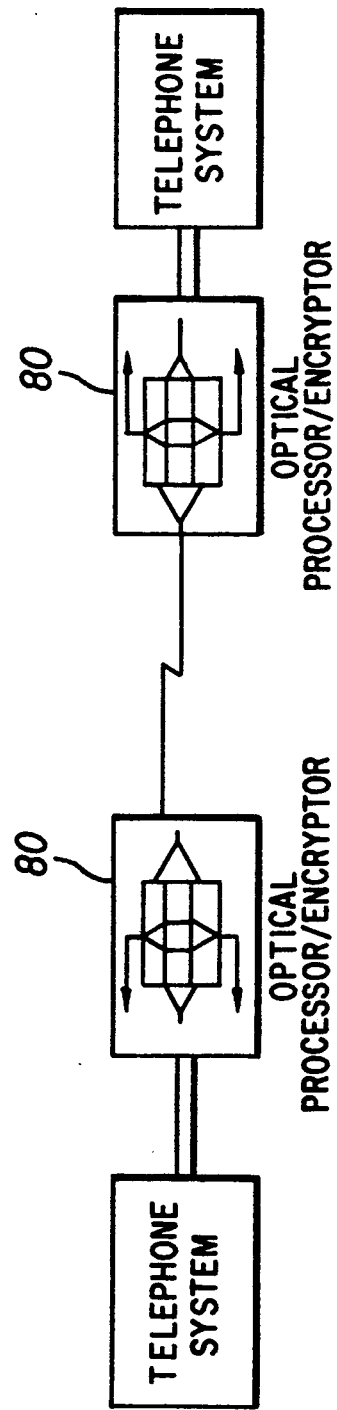

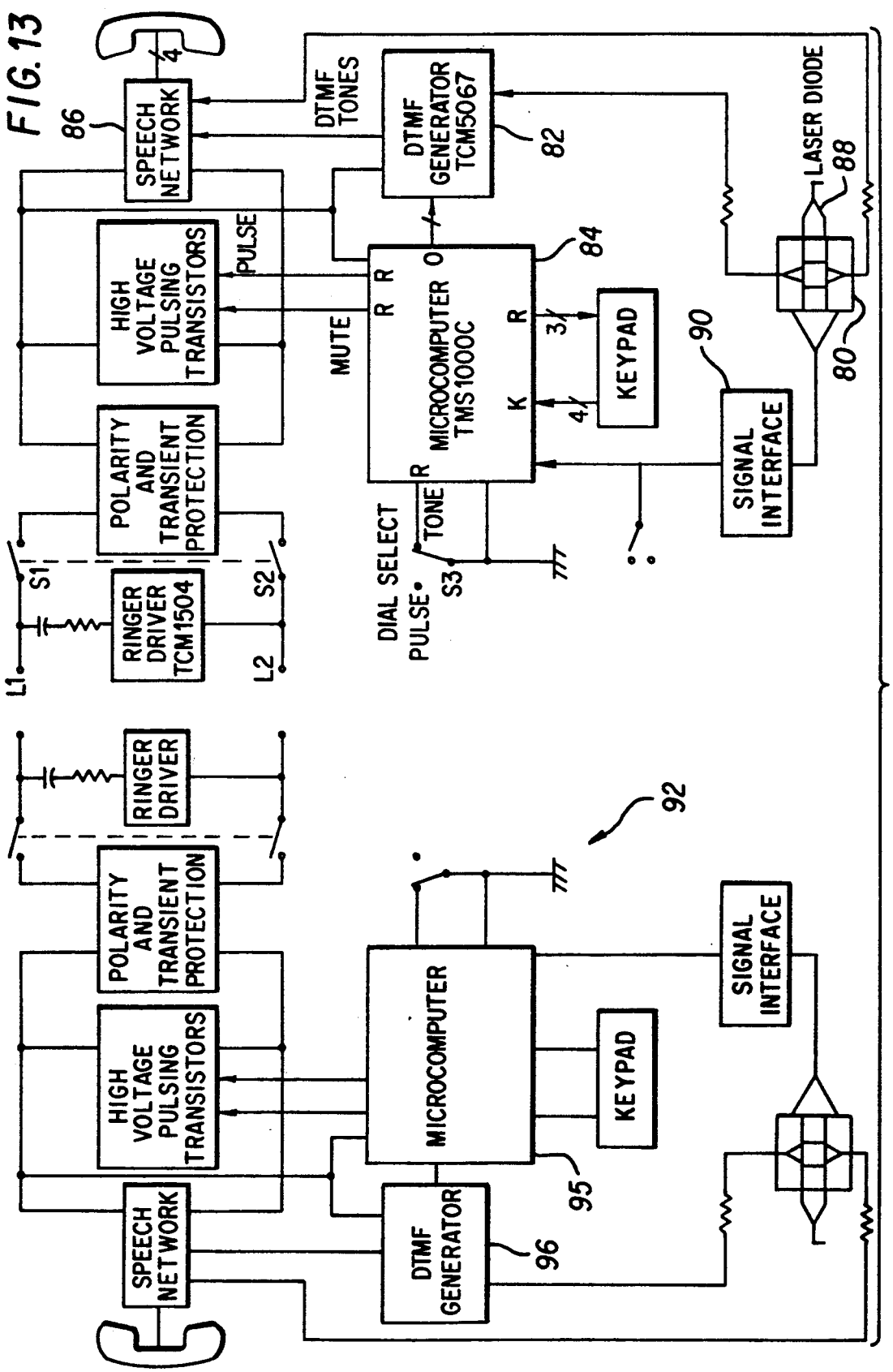

INTEGRATED OPTICAL COMPUTING ELEMENTS FOR PROCESSING AND ENCRYPTION FUNTIONS EMPLOYING NON-LINEAR ORGANIC POLYMERS HAVING PHOTOVOLTAIC AND PIEZOELECTRIC INTERFACES

RIGHTS OF THE GOVERNMENT

The invention described herein may be manufactured, used and licensed by or for the United States Government for Governmental Purposes without payment to me of any royalty thereon.

This is a continuation of application Ser. No. 07/569,893, filed Aug. 17, 1990, now abandoned.

BACKGROUND OF THE INVENTION

The present invention relates to optical devices that are based on light transmission in planar waveguides, and more particularly, to such devices employing the use of non-linear organic polymers having photovoltaic and piezoelectric interfaces.

Integrated optics is concerned with dielectric structures that confine the propagating light to a region with one or two very small dimensions, on the order of the optical wavelength. An integrated optical circuit can include lasers, integrated lenses, switches, interferometers, polarizers, modulators, detectors, etc. Important uses for integrated optical circuits include signal processing and optical communications. Integrated optical circuits can be used in such systems as optical transmitters, switches, repeaters, and receivers.

The advantages of having an optical system in the form of an integrated optical circuit rather than a conventional series of components include (apart from miniaturization) reduced sensitivity to air currents and to mechanical vibrations of the separately mounted parts, low driving voltages and high efficiency, robustness, and reproducibility and economy. As in the case of semiconductor integrated circuits, an integrated optical circuit might be fabricated on or just within the surface of one material (the substrate) modified for the different components by shaping structures (using etching, for example) or incorporating suitable substitutes or dopants, or alternatively, by depositing or expitaxially growing additional layers. It is also possible to construct independent components which are then attached to from the integrated optical circuit. This option, called hybrid, has the advantage that each component could be optimized, for example, by using gallium aluminum arsenide lasers as sources for an integrated optical circuit and silicon detectors. In the former case, the integrated optical circuit is called monolithic, and is expected to have the advantage of ease of processing, similar to the situation for monolithic semiconductor integrated circuits. One of the most promising materials for monolithic integrated optical circuits are direct band-gap semiconductors composed of III-V materials such as gallium aluminum arsenide [(GaAl)As] and indium gallium arsenide phosphide [(InGa)(AsP)] since with suitable processing they ma perform almost all necessary operations as lasers, switches, modulators, detectors, and so forth.

In the prior art, the simplest optical waveguide is a three-layer or sandwich structure with the index of refraction largest in the middle or waveguiding layer. The lower and top layers are usually the substrate and superstrate, respectively. Often, the top layer is air and the waveguide layer is referred to as a film. Sometimes, too, the outer regions are called cladding layers. A guided wave does not have light distributed uniformly across the waveguide, but is a pattern that depends on the indices of refraction of all three layers and the guide thickness. The waveguide is usually designed by selecting its refractive index and thickness, so that only one such characteristic pattern propagates with no change in shape. This pattern, referred to as the fundamental or lowest-order mode, travels down the guide with a characteristic velocity.

Waveguides have been made of many different materials, most of which may be categorized as ferroelectric, semiconductor, or amorphous. Examples of these classes are lithium niobate, gallium arsenide/gallium aluminum arsenide [GaAs/(GaAl)As], and glass, respectively. Methods for fabricating a waveguide layer at the surface of lithium niobate include heating the crystal in a vacuum to drive off lithium oxide or diffusing titanium metal into the crystal. Both processes create a region of high refractive index near the surface; air is the superstrate. A semiconductor waveguide is fabricated, for example, by growing successively crystalline layers of $(Ga_{0.7}Al_{0.3})As$, GaAs, and $(Ga_{0.7}Al_{0.3})As$. The thin GaAs waveguide layer of high refractive index is thus interposed between thicker cladding regions of the lower-index $(Ga_{0.7}Al_{0.3})As$. Glass waveguides may be formed, for example, by sputter deposition of a relatively high-refractive-index glass on a lower-index glass substrate.

Waveguides that confine light in two dimensions, rather than one, utilize refractive index differences in both transverse directions. Examples are the rib guide and the titanium-diffused channel guide. In fabricating a rib guide, photolithography is employed to delineate the stripe, followed by chemical or dry etching to remove the undesired material. The channel guide is produced by etching away all but a strip of metal prior to diffusion.

An external light beam may be coupled into a waveguide by introducing the light at the end of the guide at an edge of the substrate or through the surface of the waveguide. The former approach may employ a lens to focus the light beam onto the guide end. Alternatively, the laser or an optical fiber is placed against or in close proximity to the guide end, which is referred to as butt coupling. Light may also be injected through the guide surface with an auxiliary element such as a high-refractive index prism. The angle of light incident on the surface of the waveguide layer can also be modified so as to coincide with the internal angle of the propagating wave by a periodic structure or grating on the waveguide surface. Such a grating may be made by a multiple-step process which begins by depositing a light sensitive material called photoresist and concludes with etching and cleaning. The grating also functions as an output coupler.

The diode laser is already an integrated optics device in a sense since the lasing medium as a waveguide laser interposed between two cladding layers. The waveguide layer may be GaAs, in which case the outer regions are composed of $(Ga_{0.7}Al_{0.3})As$, for example. When used as a separate source, the crystal facets act as end reflectors. The diode laser's high efficiency, low-voltage operation, small size, and physical integrity cause it to be the laser of choice in many hybrid integrated optics applications. Moreover, it lends itself to integration in an integrated optical circuit where reflectivity may be provided by introducing an appropriate periodic structure. This could be a thickness variation in the waveguide layer. Devices utilizing such structures are called distributed feedback or distributed Bragg reflector lasers.

Both lithium niobate and gallium arsenide belong to the family of electro-optically active crystals. When an electric field is applied to these materials, their refractive indices are modified. This effect is employed in prior art integrated optical circuit switching and modulation applications. To construct a switch in the prior art, gold or other conducting electrodes are deposited on a lithium niobate integrated optical circuit surface parallel to two closely spaced waveguides. If the electrodes and waveguides are suitably designed, the applications of specific small voltages to the electrodes will cause the transfer of optical power from one waveguide to its neighbor with high efficiency and little residual power in the initial guide.

OBJECTS AND SUMMARY OF THE INVENTION

It is an object of the present invention to provide an integrated optical processor and encrypter device that uses non-linear organic polymers and employs photovoltaic and/or piezoelectric controlling interfaces.

It is a further object of the invention to utilize photovoltaic interfaces with non-linear organic polymers for control of state and processing of information/reference light beams.

It is another object of this invention to employ the use of piezoelectric controlling interfaces for utilizing electrical controlling inputs with an integrated optical processor and/or encryption device.

One object of the invention is to provide an integrated optical AND and OR gate with optical inputs to control the processing logic of a reference information light.

Another object of the invention is to provide a integrated optical processor and encryption device that can be employed in communication, telephone systems, and computer networks.

A further object of this invention is to provide an integrated optical processor and encryption device that employs dual controlling input signals to control the non-linear organic polymer's index of refraction.

A still further object of this invention is the mixing of reference optical and electrical controlling inputs with a key or encrypting controlling optical or electrical input across a non-linear organic polymer cell to process or encrypt a reference light on an integrated optical chip.

Another object of the invention is to provide a device for integrating a series of integrated optical processors to perform computational, digital or analog functions in a system, network, or functional block/cell.

A further object of this invention is to provide an optical computer and processor that can perform digital, Boolean, computational and analog functions in a system, network, or functional cell.

The present invention consists of various embodiments of integrated optical computing elements and devices using non-linear organic polymers for processing and encryption functions. These novel designs encompass integrated optical devices and computing elements, integrated optical AND and OR gates, devices that perform processing and encryption functions, optical computational devices, and integrated optical communication devices. These new and novel integrated optical devices and components utilize non-linear organic polymers along with unique controlling interface designs that utilize photovoltaic cells and piezoelectric crystal devices or layers. The non-linear organic polymers are controlled by these interface devices to induce or effect proportional changes in the index of refraction or molecular orientation of the non-linear cell. This in turn induces or effects concurrent changes in a reference coherent light or laser beam that is passing o travelling through the non-linear organic element of the integrated optic. Non-linear organic polymers and materials react very fast (micro to nanosecond region) to changes of voltage or acoustic stress waves, such as that produced by piezoelectric crystal materials and voltages generated by photovoltaic devices.

For optical controlling inputs, interface designs employ photovoltaic cells coupled to a piezoelectric device for direct interface control of the non-linear organic polymer cell. The optical input on the photovoltaic element generates an output voltage across the piezoelectric element which generates a stress wave on the non-linear organic polymer. This stress in turn changes the index of refraction in the non-linear organic cell, proportionately inducing degrees of diffraction on a reference laser light beam passing through the cell. A multiple of diffraction output can be produced, or an on-off light output condition generated for digital computational operations.

For an opto-electronic device employing electrical voltage or current controller signal inputs, the piezoelectric crystal can be used by itself to transform the electrical input into the controlling stress condition on the non-linear organic cell. In addition, the piezoelectric cell can be utilized in its other mode of operation, converting audio or acoustic energy into voltage potential, producing an electric field or voltage potential across the polymer cell, changing the molecular orientation and indexes of refraction, thus inducing proportional changes in the traversing reference beam. This will produce a processed output information laser signal.

Figure 4:
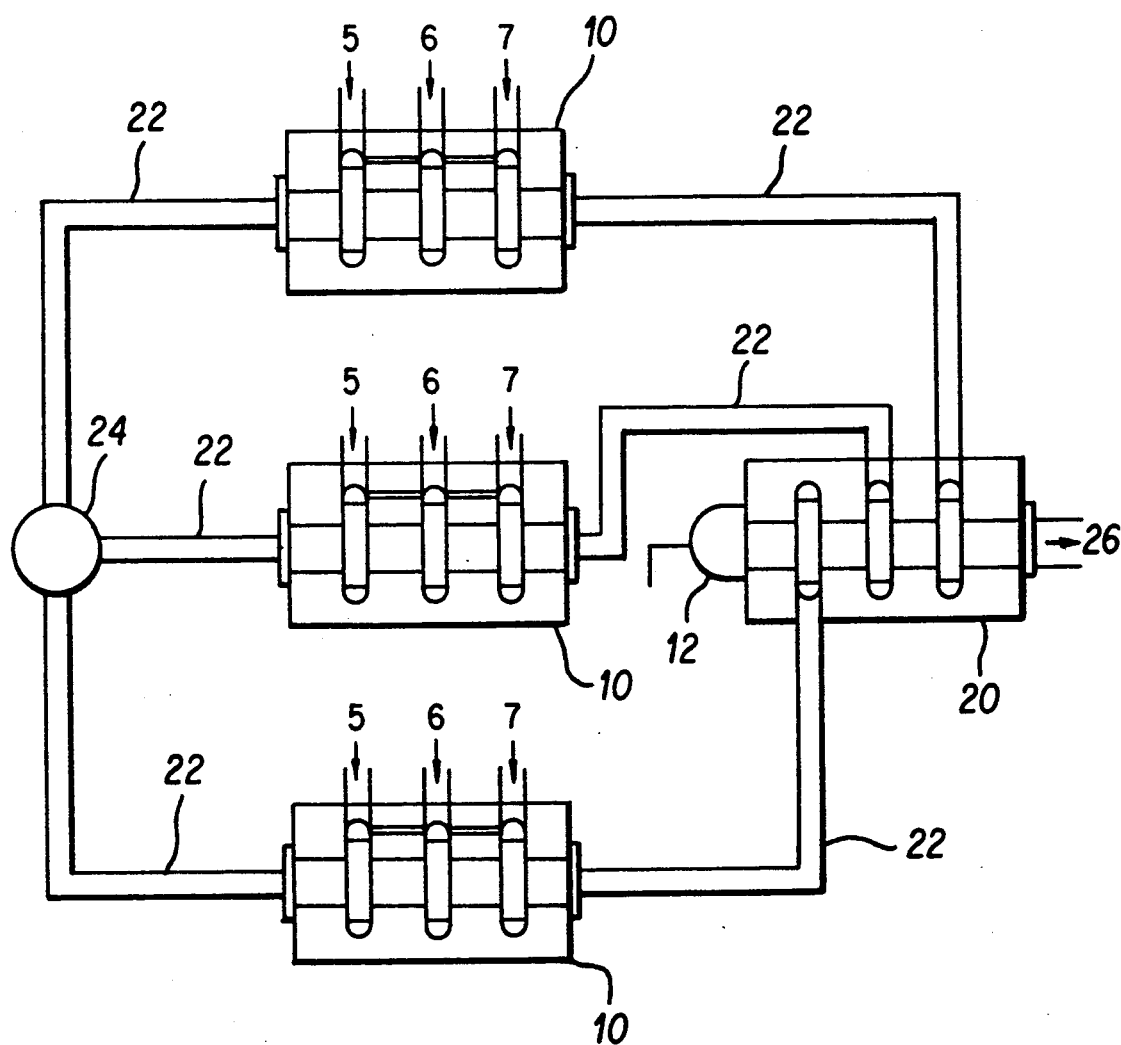
FIG. 4 depicts a logical processing circuit of a purely optical nature with three integrated optical OR gates and one integrated optical AND gate.

FIG. shows the associated Boolean logic diagram of the circuit of FIG. 4.

Figure 6:
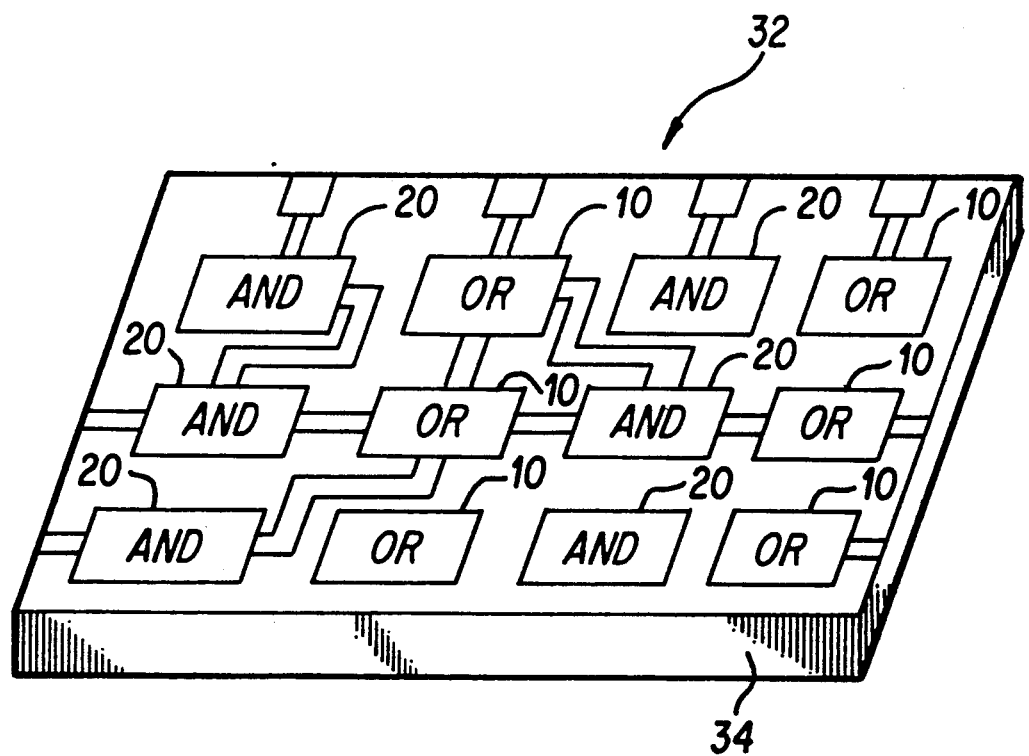

FIG. 6 depicts an integrated optical circuit block device employing non-linear organic polymers and optical controlling interfaces.

Figure 7:
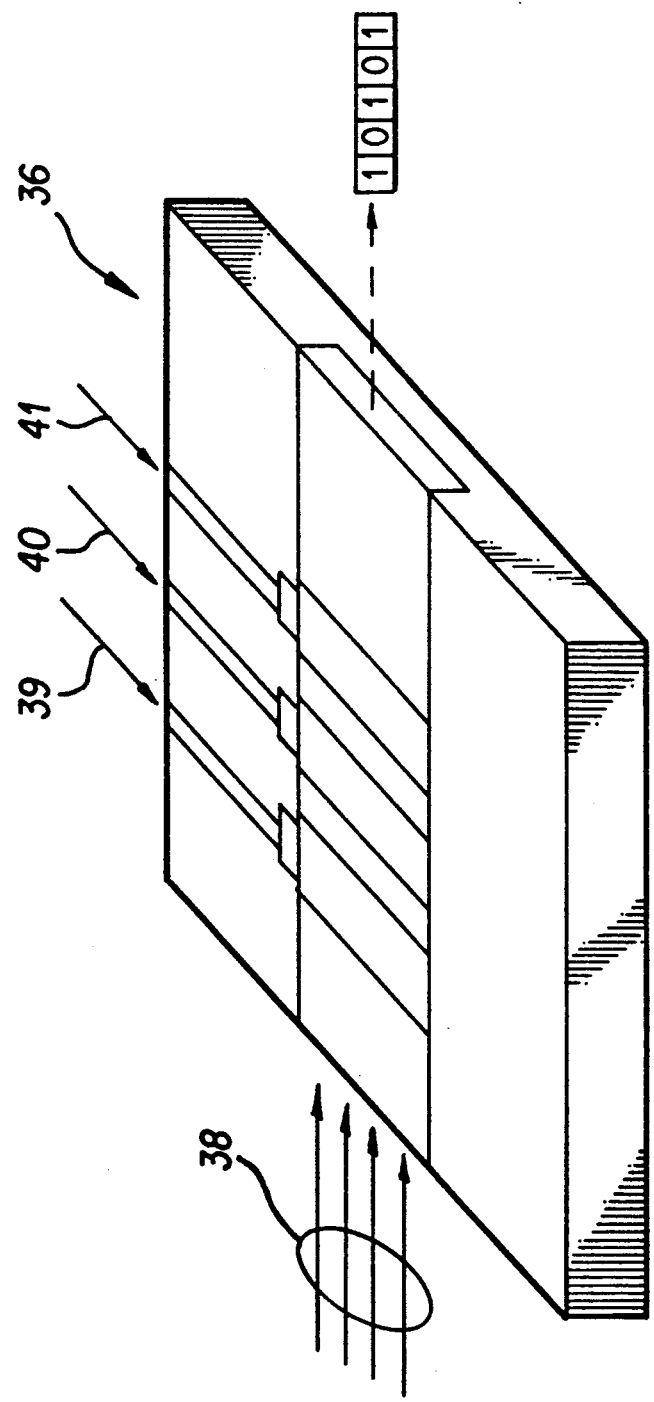

FIG. 7 depicts an integrated optical processing circuit that performs computational logic and processing on a reference laser light beam.

Figure 8:
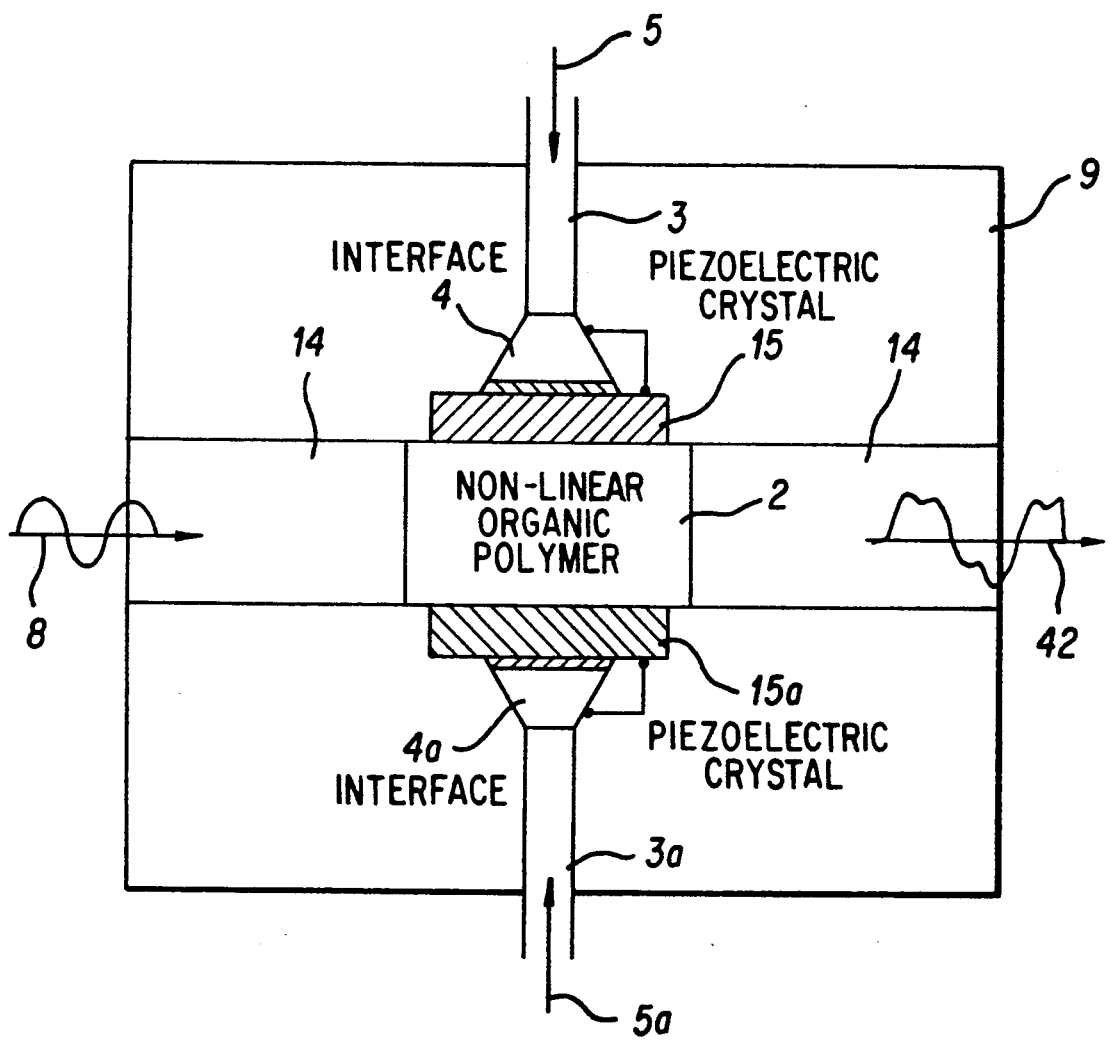

FIG. 8 depicts the configuration for the controlling input interface to the non-linear organic polymer employing a photovoltaic/piezoelectric crystal interface layer.

Figure 9:
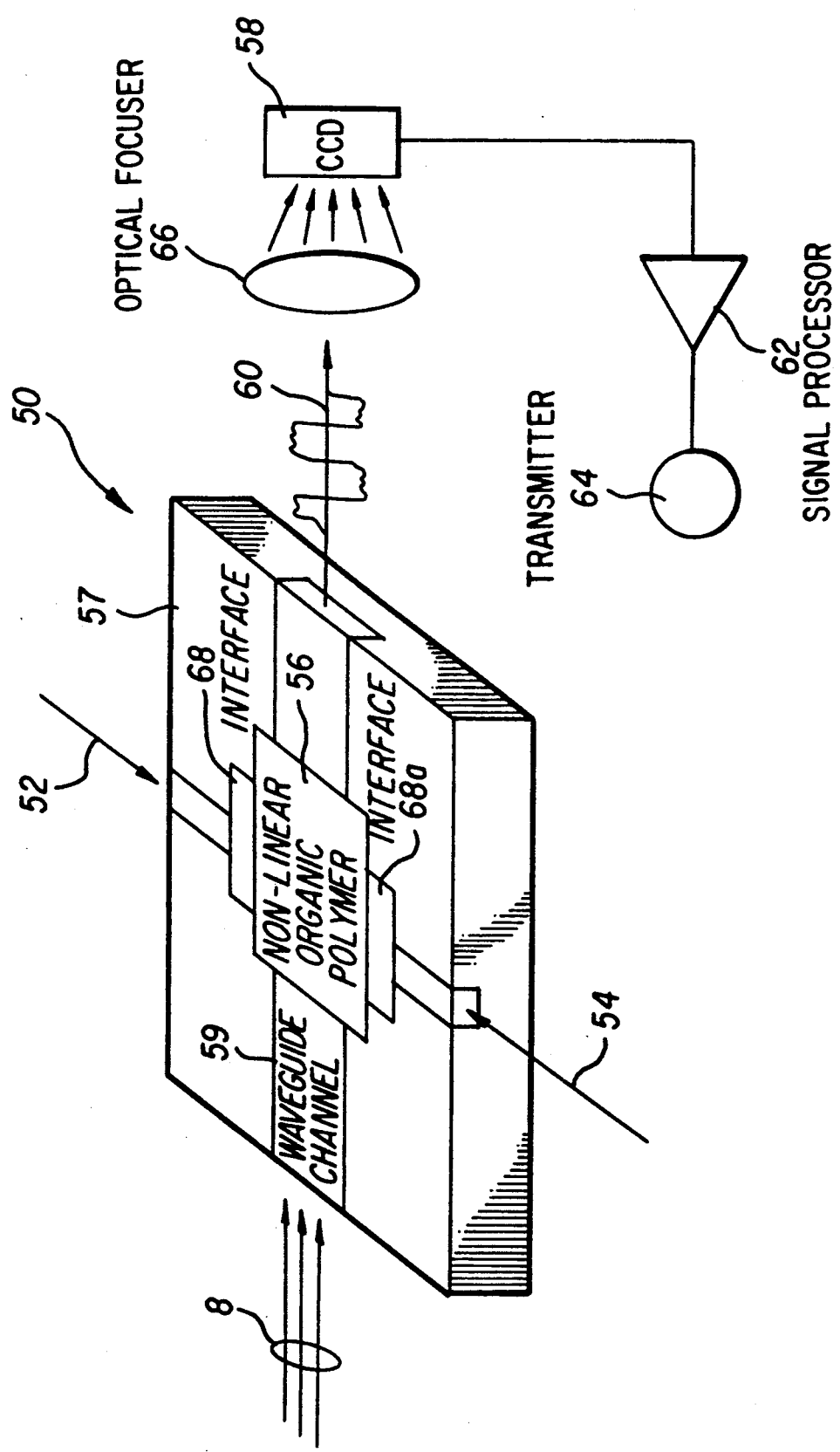

FIG. 9 depicts the design and construction of an integrated optical processor/encryption device according to the present inventive concept.

Figure 10:
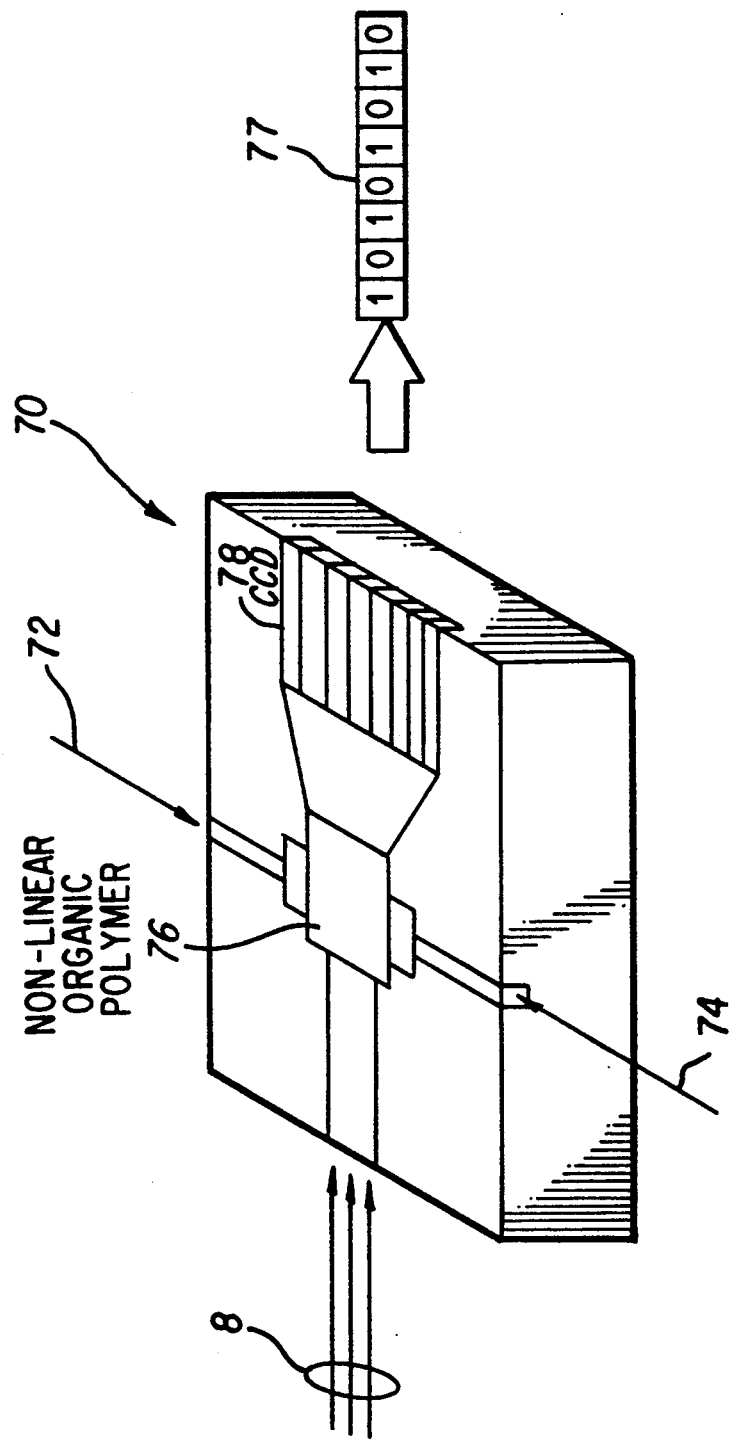

FIG. 10 depicts an integrated optical processor or encryption device that employs dual controlling input signals to control the index of refraction of the non-linear organic polymer to determinately diffract a reference laser light to a photodetector array.

FIG. 11 depicts a block diagram of a computer to computer encrypting link employing an integrated optical processor or encrypter.

FIG. 12 depicts a block diagram of a telephone communication encrypting link employing an integrated optical processor or encrypter.

FIG. 13 depicts a schematic diagram of an integrated optical processor or encrypter employed in a modern telephone system.

DETAILED DESCRIPTION OF THE PREFERRED EMBODIMENTS

Figure 1:
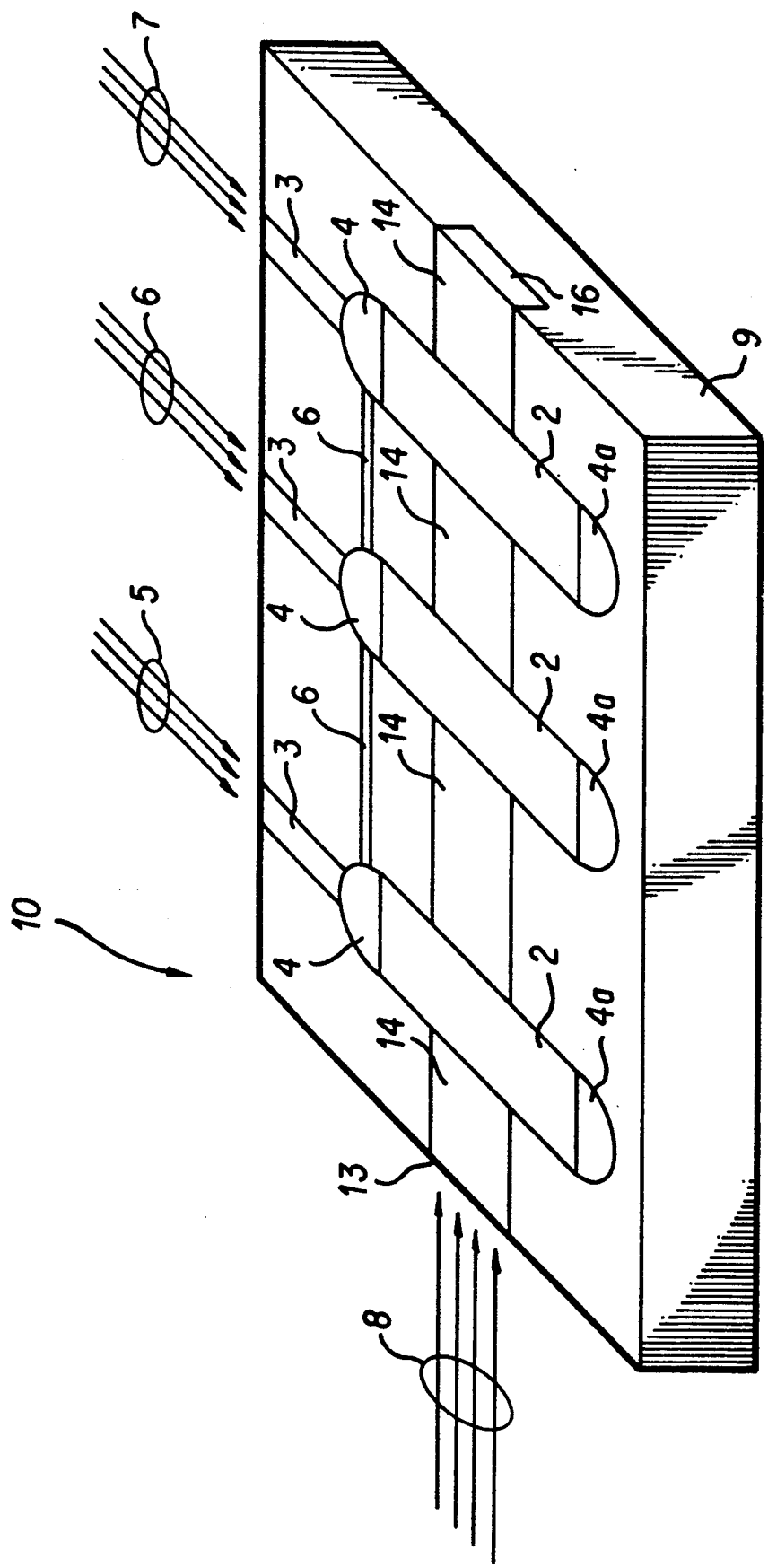
FIG. 1 depicts an integrated optical OR gate according to the present invention employing photovoltaic controlling input interfaces.
Figure 2:
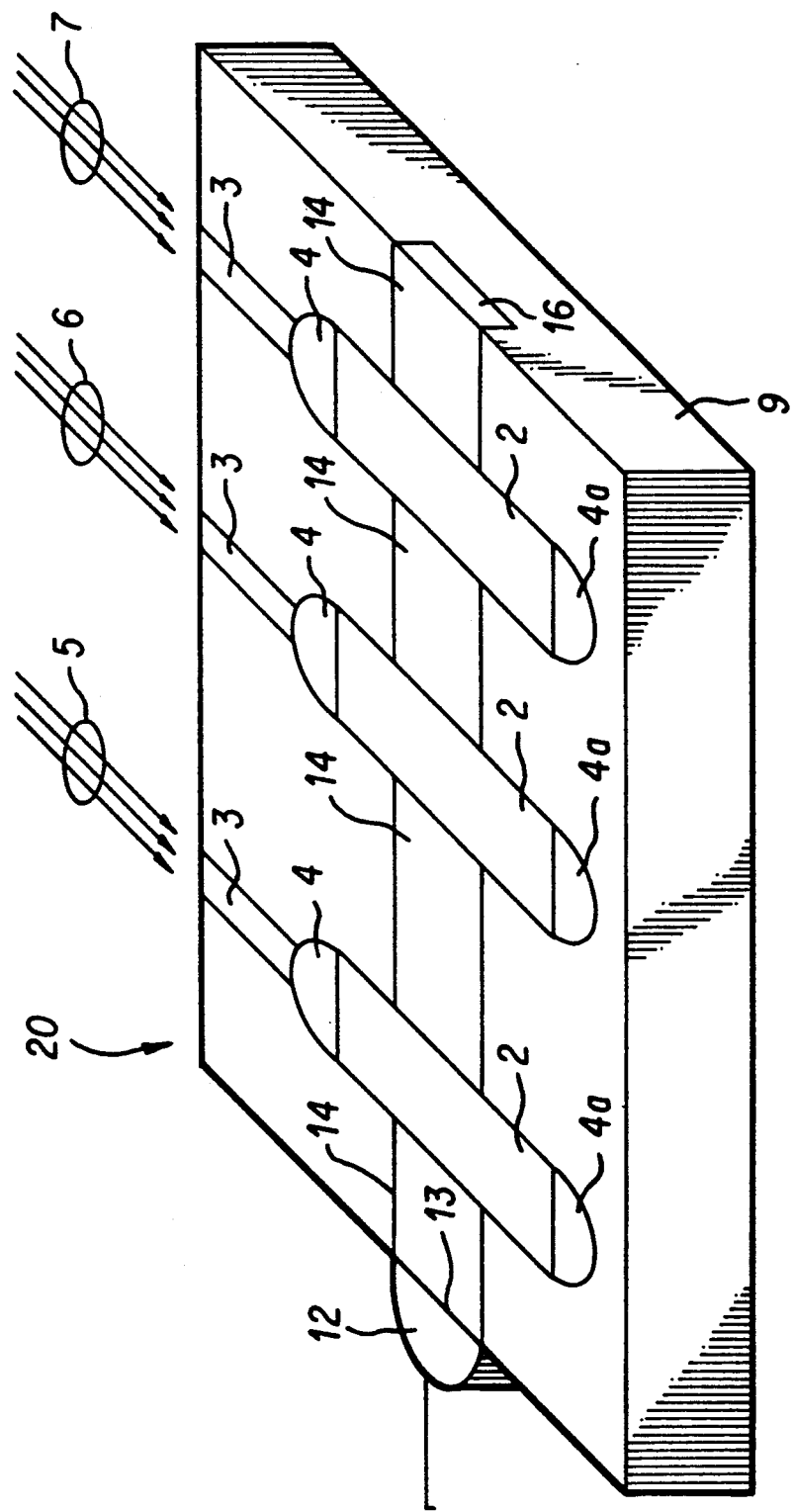
FIG. 2 depicts an integrated optical AND gate according to the present invention employing photovoltaic controlling input interfaces.
Figure 3:
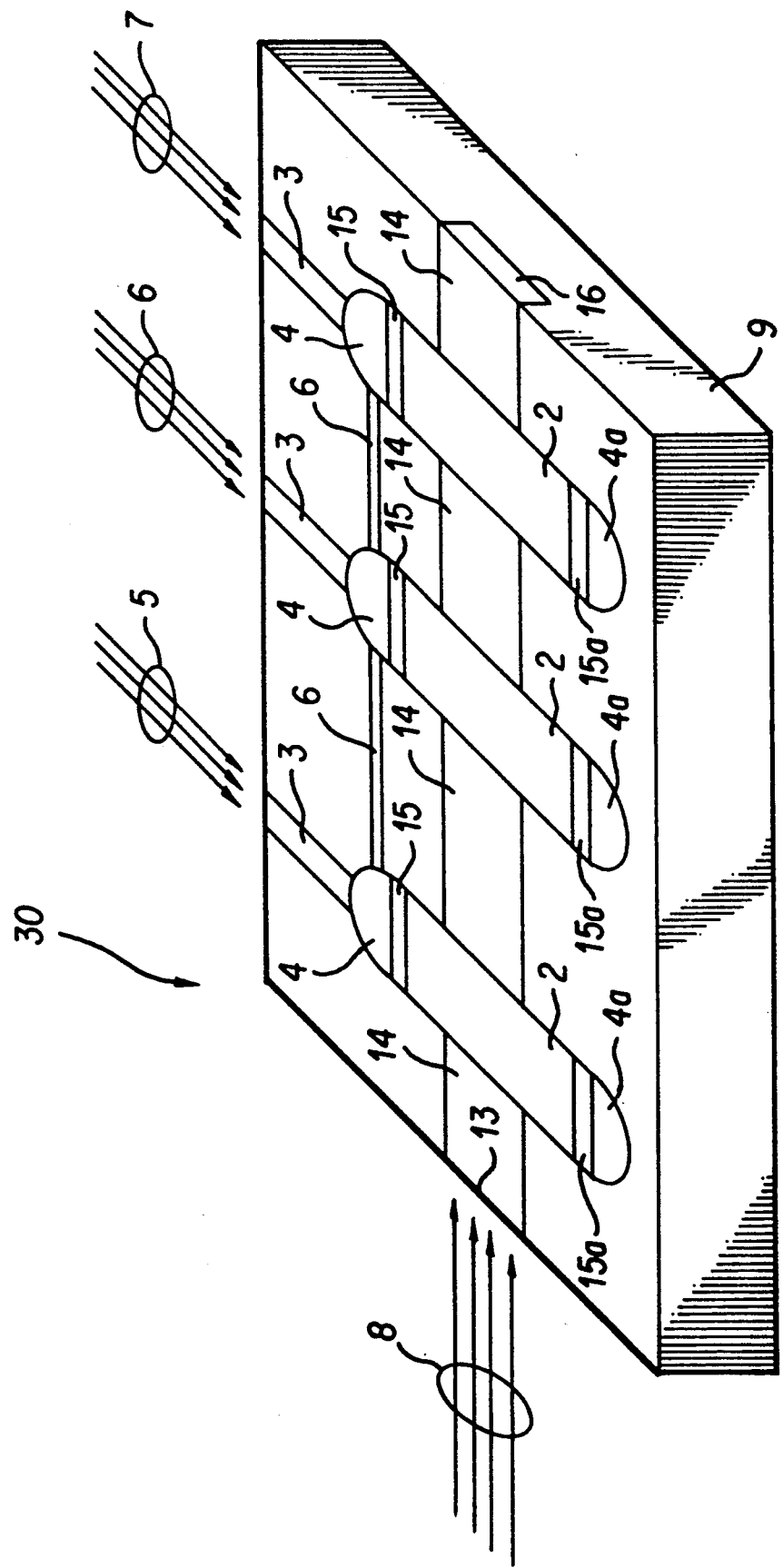
FIG. 3 depicts an integrated optical OR gate according to the present invention employing photovoltaic/piezoelectric controlling input interfaces.

FIGS. 1-3 depict a new and novel integrated optical device with FIG. 1 depicting an integrated optical OR gate 10 and FIG. 2 depicting an integrated optical AND gate 20 according to the present invention with both using non-linear organic polymers 2 with a photovoltaic interface 4. A discussion of optical AND and OR gates employing non-linear organic polymers with photovoltaic and/or piezoelectric interfaces can be found in my co-pending application Ser. No. 07/513,472 now U.S. Pat. No. 5,121,249 issued Jun. 9, 1992 which is hearby incorporated by reference. Some examples of non-linear organic polymers that would be suitable for use are: Indathrones, stilbenes, pyridine N-oxides, cyanine dyes, MNA, polyacetylene, and precursor polymer (PFX family). As shown in FIG. 1, integrated optical OR gate 10 has three non-linear organic polymers formed in a conventional manner on monolithic substrate 9 and on waveguide channel 14 and therefore OR gate 10 has three signal inputs 5, 6, and 7 which can be optical input signals, laser light input signals, electrical input signals, or audio input signals depending upon the interface used. Electrical or audio input signals would facilitate both digital and analog processing and computational operations whereby the integrated optical gates could be interconnected to produce computational systems performing digital or analog operations. If a optical input signal is desired, then an optical waveguide channel 3 is formed on substrate 9 and would extend from an edge of substrate 9 to interface 4. In a similar fashion, electrical and audio input channels could be formed on substrate 9 in a conventional manner. Integrated optical OR gate 10 also has a reference information (typically laser) light 8 coming from a separate independent source, and for comparison sake integrated optical AND gate 20 has an attached laser diode 12 providing the reference information light to be processed thus providing for the transmission of digital outputs, Boolean logic, or designated computational information. Both AND gate 20 and OR 10 are constructed on a monolithic crystalline substrate 9 of gallium aluminum arsenide [(GaAl)As], indium gallium arsenide phosphide [(InGa)(AsP)], lithium niobate [LiNbO$_3$] or titanium-diffused lithium niobate.

For the integrated optical AND gate 20 and the integrated optical OR gate 10, fundamental Boolean algebra and digital electronic functions and operations can be performed. These AND and OR gates have a set of inputs 5, 6, and 7 which designate or produce a given output at end face 16. The AND and OR gates thus have three inputs $X_1$, $X_2$, and $X_3$ (at inputs 5, 6, and 7) and one output state Y (at end face 16) and can be represented by the following tables:

| OR | | | | AND | | | |
|---|---|---|---|---|---|---|---|
| $X_1$ | $X_2$ | $X_3$ | Y | $X_1$ | $X_2$ | $X_3$ | Y |
| 0 | 0 | 0 | 0 | 0 | 0 | 0 | 0 |
| 0 | 0 | 1 | 1 | 0 | 0 | 1 | 0 |
| 0 | 1 | 0 | 1 | 0 | 1 | 0 | 0 |
| 0 | 1 | 1 | 1 | 0 | 1 | 1 | 0 |
| 1 | 0 | 0 | 1 | 1 | 0 | 0 | 0 |
| 1 | 0 | 1 | 1 | 1 | 0 | 1 | 0 |
| 1 | 1 | 0 | 1 | 1 | 1 | 0 | 0 |
| 1 | 1 | 1 | 1 | 1 | 1 | 1 | 1 |

FIGS. 1 and 2 show a photovoltaic cell interface 4 that is used in conjunction with an optical input at 5, 6, and 7. The photovoltaic cell interface 4 directly couples non-linear organic polymers 2 to the optical inputs at 5, 6, and 7 which arrive at the interface 4 through waveguide channels 3 and generate a voltage output in each photovoltaic cell interface 4. As reference information light 8 enters light (optical) waveguide channel 14 (which extends longitudinally along substrate 9) at input end-face 13 it travels through light waveguide channels 14 and is either stopped by the first non-linear organic polymer 2 or allowed to pass through the first non-linear organic polymer 2, depending upon the state of the first non-linear organic polymer 2. If passed it then continues down light waveguide channel 14, passing (or stopped by) subsequent non-linear organic polymers 2 until if passed by all three non-linear organic polymers 2 it exits at output end-face 16. This digital output (on or off) from the integrated optical gate can then be transmitted to a photodetector array, a Charge Coupled Device (CCD), or to another integrated optical gate depending upon the particular application desired. Optical waveguide channels 3 and 14 may be made in a conventional manner from lithium niobate, gallium arsenide, glass, thin films, ferroelectric semiconductor or amorphous materials. In integrated optical OR gate 10, photovoltaic cell interfaces 4 are interconnected by electrical conduction path or cables 6 in order to produce the OR Boolean operation. Integrated optical AND gate 20 has separated photovoltaic interfaces 4 to produce the Boolean operations for AND functions.

FIG. 3 shows an integrated optical OR gate 30 that uses both a photovoltaic cell interface 4 and a piezoelectric crystal interface 15 to control input signals 5, 6, and 7 and can respond to a discrete state of input signal light. The photovoltaic/piezoelectric interface itself is described in greater detail in FIG. 8. As in FIG. 2, an integrated optical AND gate can also be constructed with a photovoltaic cell adjacent to a piezoelectric interface by omitting cable 6. A photovoltaic interface could also be coupled to a piezoelectric film over non-linear organic polymer 2. This type of interface is described in my co-pending application. Piezoelectric plastic films are flexible and can cover and seal the non-linear organic polymers as well as the entire gate. In all of the integrated optical gates depicted in FIG. 1-3, the input signal controlling interfaces (photovoltaic or photovoltaic adjacent to piezoelectric) can be duplicated on the opposite side of the gate and shown as numeral 4a on the figures. This would facilitate flexibility in system design and placement of the devices in a layout.

Figure 5:
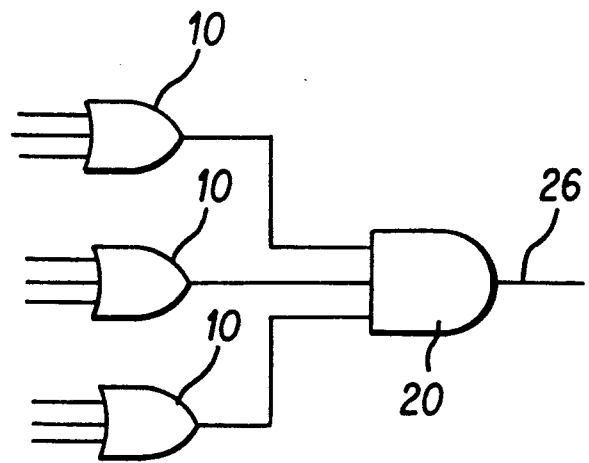

FIG. 4 shows an arrangement in which three integrated optical OR gates 10 and one integrated optical AND gate 20 are connected together with a fiber optic cable 22 to form a logical processing or computing network/circuit of a purely optical nature. The associated Boolean logical diagram is shown in FIG. 5. FIG. 4 shows by way of example three integrated optical OR gates 10 receiving the reference laser light from a common laser light source 24. This reference laser light is then processed as described above by each of the three integrated optical OR gates 10. Each integrated optical OR gate 10 has input signals 5, 6, and 7 establishing the Boolean operation of the gate. The generated optical outputs from the integrated optical OR gates 10 are then connected to the inputs of an integrated optical AND gate 20, controlling the state of each non-linear organic polymer cell in AND gate 20. By way of example, integrated optical AND gate 20 has an attached laser diode 12 generating the reference laser light for this gate. Integrated optical OR gates 10 could also have an attached laser diode for independent operation. The optical output signal 26 from integrated optical AND gate 20 is a resulting digital value in optical form. This could be either sent to a photodetector, CCD or another integrated optical device for further processing, storage, or a resulting value.

The devices shown in FIGS. 1-3 can be combined into an integrated optical circuit block chip 32 employing non-linear organic polymers and optical controlling interfaces as depicted in FIG. 6. As is shown, circuit block 32 has a layout of optical AND gates 20 and optical OR gates 10 formed on a single conventional monolithic crystalline substrate 34. The manner in which the optical controlling inputs are used and how laser diodes are used for reference laser light determine the system or computational operation of integrated optical circuit block chip 32. In a conventional manner, selected optical OR gates 10 and optical AND gates 20 are connected by optical waveguide channels providing a customized chip 32. Input signals are provided to each gate as described for FIGS. 1-3 and can be integrated to generate the determined design for the logic of processing operation. Outputs from the integrated optical gates can be state controlling inputs to other non-linear optical gates. FIG. 6 is thus a multiple integrated optical device comprised on one substrate of optical AND and OR gates with inputs to control the processing logic or operation on the reference information light. Also, the individual non-linear organic processing cells can perform analog operations, as well as the digital Boolean operations.

FIG. 7 depicts an integrated optical processing circuit 36 that performs computational logic and processing on a reference laser light beam 38. Controlling inputs 39, 40, and 41 can be optical, electrical, or audio which will determine the type of interface.

FIG. 8 depicts the configuration of the controlling input interface to the non-linear organic polymer employing a photovoltaic cell adjacent to a piezoelectric crystal. Non-linear organic polymer 2 is adjacent to piezoelectric crystal 15 and 15a. An alternate method of packaging non-linear organic polymer 2 would be in a piezoelectric film, such as a flexible piezoelectric plastic film. Connected to each piezoelectric crystal 15 and 15a is a photovoltaic cell 4 and 4a that respond to input optic signals 5 and 5a which can be laser beams or other known illuminations. The conversion of input optic signals 5 and 5a to electrical signals by the photovoltaic cells can be based on a threshold level of intensity, or a basic on/off light state to represent a 1 for on (optic signal present) and 0 for off (no optic signal). Spacing or distance between the non-linear organic polymers (shown in FIG. 3) can and will vary, depending on the fabrication technique and desired optical operation or requirements. The distance or spacing can vary from a fraction of a millimeter to larger distances in centimeters. The smaller the spacing or distance between the non-linear organic polymers would most likely be most desirable and optimal in order to decrease the size of the device and its subsequent packing and fabrication.

When an input optic signal 5 (or 5a) that represents the on or 1 state is present, photovoltaic cell 4 (or 4a) generates a voltage that produces a voltage potential on piezoelectric crystal 15 (or 15a) to which it is connected. Piezoelectric crystal 15 (or 15a) in turn generates an acoustic stress wave through non-linear organic polymer 2 causing a change in its index of refraction, thus proportionately affecting reference laser light beam 8 passing through this gate. For example, when input signal 5 represents input state 1, photovoltaic cell 4 generates a voltage and produces a voltage potential on piezoelectric crystal 15, which in turn generates an acoustic stress wave through non-linear organic polymer 2 causing it to change its index of refraction which allows reference laser beam 8 to pass straight through non-linear organic polymer 2. In a similar fashion, when input signal 5a represents input state 0, photovoltaic cell 4a does not generate a voltage nor produce a voltage potential on piezoelectric crystal 15a, therefore no acoustic stress wave is passed through non-linear organic polymer 2 and the index of refraction of non-linear organic polymer 2 does not change, therefore reference laser beam 8 does not pass straight through non-linear organic polymer 2.

FIG. 9 depicts the design and construction of an integrated optical encryption device 50 according to the present inventive concept. A dual controlling interface 68 and 68a is coupled to a gate consisting of non-linear organic polymer 56 formed on monolithic crystalline substrate 57, which employs a reference input signal 52 and a key or encrypting signal 54 to be mixed across non-linear polymer 56. Interface 68 and 68a can be photovoltaic or photovoltaic/piezoelectric for optical inputs or piezoelectric for electrical or audio inputs. As in the above embodiments optical waveguide channel 59 is provided for laser light 8. This integrated optical device can have a multitude of applications, including communication systems and devices, along with the standard modern telephone, as shown in FIG. 13. Input signals 52 and 54 can be optical, audio, or electrical. By way of example, a photodetector array, or a CCD 58 could receive the processed or encrypted output laser light 60 from an optical focuser 66, passing the information beam along to another signal processor 62 and/or transmitter 64.

An integrated optical processor/encryptor is shown in FIG. 10 that employs dual controlling input signals 72 and 74 for control of the index of refraction of the non-linear organic polymer 76 to determinately diffract the reference laser light 8 to a photodetector array or CCD 78. As shown in the figure, the optical waveguide is fanned out to accommodate the various degrees of diffraction of light beam 8. The information will be directed to the designated detector cell or receiver. A CCD can also be employed. This discrete fan out allows and facilitates multiple path processing of the light and also parallel bit processing. The output 77 can comprise an eight, sixteen, or thirty-two bit word or byte. This integrated optic device can also be utilized in neural networks of an optical nature for neural processing design. This type of integrated optical processor/encryptor could also be employed in FIG. 13 for a modern telephone encrypting system.

FIGS. 11 and 12 shows a block diagram for the design of an integrated optical processor/encryptor used in a computer to computer communication link and a telephone communication network link. Integrated optical device 80 is used as an encryption device for either a computer to computer link, or a telephone to telephone link. The telephone to telephone link is more fully described in FIG. 13.

As shown in FIG. 13, an integrated optical processor/encryptor 80 can employed in the design of a modern telephone unit. The encrypted audio signal that drives or establishes one side of the controlling input, is generated by a DTMF (tone) generator 82 which has a programmed key from the microprocessor 84. The information input comes directly from the speech network 86. This dual input establishes the processing state of the device, encrypting and encoding the optical output. A laser diode 88 will generate the reference laser light beam for processing. Processing of the reference beam occurs as previously described (diffraction and encoded modulation). A photodetector array, pin diode, or CCD receives the encrypted or processed light signal/information carrier. The encrypted information is sent to microcomputer 84 through signal interface 90. Microcomputer 84 then transfers the encrypted information signal to the transmitter circuits. Microcomputer 84 can also attach a special code to identify the encryption key being used by tone generator 82. There can be a preset menu of encryption key codes that could be chosen by microcomputer 84 or by the user.

The receiver system 92 receives the encrypted information signal and processes it through integrated optical processor/encryptor 94 utilizing the encrypted key to decode the transmitted signal. The speech network or microcomputer 95 would recognize the designated encryption key being utilized for information processing. The encryption key information would be relayed to tone generator 9 for generation of the decryption signal to the key input side of this design. The full encrypted signal would be inputted to the other side of the integrated optical audio processor or encrypter 94 and be time synchronized with the encrypted key input to establish the decoding mode for this communication/telephone network 92. The end result will be secure transmission and reception of telephone, computer, or communication messages and information.

To those skilled in the art, many modifications and variations of the present invention ar possible in light of the above teachings. It is therefore to be understood that the present invention can be practiced otherwise than as specifically described herein and still will be within the spirit and scope of the appended claims.

I claim:

1. An integrated optical device comprising:
a monolithic crystalline substrate;
an optical waveguide channel having an input end-face and an output end-face formed on said substrate and extending longitudinally along said substrate;
said optical waveguide channel having at least one optical cell thereon comprised of an optically non-linear organic polymer;
signal means to said optical cell;
an interface responsive to said signal input means for controlling the refractive index of said optical cell, the interface being of an piezoelectric crystal formed on the substrate.

2. The device of claim 1 wherein said interface is photovoltaic device formed on said substrate.

3. The device of claim 1 wherein said interface is a piezoelectric crystal adjacent to a photovoltaic cell formed on said substrate.

4. An integrated optical OR gate comprising:
a monolithic crystalline substrate;
an optical waveguide channel having an input end-face and an output end-face formed on said substrate and extending longitudinally along said substrate;
said optical waveguide channel having two or more optical cells thereon each comprised of an optically non-linear organic polymer;
signal means to each optical cells;
an interface of an piezoelectric crystal formed on said substrate responsive to said signal input means for controlling the refractive index of each optical cell;
an electrical conduction path between each interface.

5. The device of claim 4 wherein said interface is a photovoltaic device formed on said substrate.

6. The device of claim 4 wherein said interface is a piezoelectric crystal adjacent to a photovoltaic cell formed on said substrate.

7. An integrated optical circuit block comprising:
a monolithic crystalline substrate;
a plurality of integrated optical OR gates formed on said substrate each comprised of;
  a monolithic crystalline substrate;
  an optical waveguide channel having an input end-face and an output end-face formed on said substrate and extending longitudinally along said substrate;
  said optical waveguide channel having two or more optical cells thereon each comprised of an optically non-linear organic polymer;
  signal input means to each optical cell;
  an interface responsive to said signal input means for controlling the refractive index of each optical cell;
  an electrical conduction path between each said interface;
a plurality of integrated optical AND gates formed on said substrate each comprised of:
  a monolithic crystalline substrate;
  an optical waveguide channel having an input end-face and an output end-face formed on said substrate and extending longitudinally along said substrate;
  said optical waveguide channel having two or more optical cells thereon each comprised of an optically non-linear organic polymer;
  signal input means to each optical cell;
  an interface responsive to said signal input means for controlling the refractive index of each optical cell;
  an electrical conduction path between each interface;
a plurality of optical AND gates each comprising:
  a monolithic crystalline substrate;

an optical waveguide channel having an input end-face and an output end-face formed on said substrate and extending longitudinally along said substrate;

said optical waveguide channel having tow or more optical cells thereon comprised of an optically non-linear organic polymer;

signal input means to each optical cell;

an interface responsive to said signal input means for controlling the refractive index of each optical cell;

a plurality of fiber-optic cables connecting said plurality of optical AND and OR gates.

8. An optical computational network comprising:

a plurality of optical OR gates each comprising:

a monolithic crystalline substrate;

an optical waveguide channel having an input end-face and an output end-face formed on said substrate and extending longitudinally along said substrate;

said optical waveguide channel having two or more refractively alterable optical cells thereon each comprised of an optically non-linear organic polymer;

signal input means to each refractively alterable optical cell;

an interface responsive to said signal input means for controlling the state of each refractively alterable optical cell;

an electrical conduction path between each interface;

a plurality of optical AND gates each comprising:

a monolithic crystalline substrate;

an optical waveguide channel having an input end-face and an output end-face formed on said substrate and extending longitudinally along said substrate;

said optical waveguide channel having two or more refractively alterable optical cells thereon comprised of an optically non-linear organic polymer;

signal input means to each refractively alterable optical cell;

an interface responsive to said signal input means for controlling the state of each refractively alterable optical cell;

a plurality of fiber-optic cables connecting said plurality of optical AND an OR gates.

* * * * *